US012776691B2

(12) United States Patent
Griesbach

(10) Patent No.: US 12,776,691 B2
(45) Date of Patent: Oct. 27, 2026

(54) ARRANGEMENT FOR GROUNDING A SHAFT

(71) Applicant: ZF Friedrichshafen AG, Friedrichshafen (DE)

(72) Inventor: Michael Griesbach, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 291 days.

(21) Appl. No.: 18/435,307

(22) Filed: Feb. 7, 2024

(65) Prior Publication Data

US 2024/0266928 A1 Aug. 8, 2024

(30) Foreign Application Priority Data

Feb. 8, 2023 (DE) ......................... 102023201006.2

(51) Int. Cl.
*H02K 11/40* (2016.01)
*B60R 16/06* (2006.01)

(52) U.S. Cl.
CPC .............. *H02K 11/40* (2016.01); *B60R 16/06* (2013.01)

(58) Field of Classification Search
CPC . H02K 11/40; H02K 5/00; H02K 5/26; H02K 7/00; H02K 7/003; B60R 16/06; A61K 31/433
See application file for complete search history.

(56) References Cited

U.S. PATENT DOCUMENTS

| | | | | |
|---|---|---|---|---|
| 9,653,970 B2 * | 5/2017 | Reed | H02K 11/028 | |
| 2010/0001602 A1 * | 1/2010 | Bossaller | H02K 11/40 | 29/596 |
| 2014/0097714 A1 * | 4/2014 | Oda | H02K 9/24 | 310/58 |

FOREIGN PATENT DOCUMENTS

| | | |
|---|---|---|
| DE | 102019133677 A1 | 6/2021 |
| DE | 102021213387 A1 | 6/2023 |

OTHER PUBLICATIONS

Copy of German Search Report for Application No. 102023201006.2 Dated Dec. 15, 2023.

* cited by examiner

*Primary Examiner* — Naishadh N Desai
(74) *Attorney, Agent, or Firm* — Dority & Manning, P.A.

(57) ABSTRACT

An arrangement for grounding a shaft of an electric machine includes a housing, and a grounding hub for electrically conductively connecting a shaft to be grounded to the housing, where the housing acts as a ground. Additionally, the arrangement includes a guide element mounted on the grounding hub. The guide element at least one of: rotationally fixes the grounding hub in a direction of rotation, or limits displacement of the grounding hub in at least one axial direction.

18 Claims, 10 Drawing Sheets

ARRANGEMENT FOR GROUNDING A SHAFT

CROSS-REFERENCE TO RELATED APPLICATION

The present application is related and has right of priority to German Patent Application No. 10 2023 201 006.2 filed on Feb. 8, 2023, the entirety of which is incorporated by reference for all purposes.

FIELD OF THE INVENTION

The invention relates generally to an arrangement for grounding a shaft, in particular a rotor shaft of an electric machine, the arrangement including a grounding hub, via which the shaft to be grounded is electrically conductively connected to a ground, preferably a housing. The invention also relates generally to a transmission, an electric drive axle unit for a motor vehicle, and to an electric machine, in each of which the aforementioned arrangement is implemented.

BACKGROUND

Electric machines are used in the automotive field in order to provide the motor vehicle as a hybrid or electric vehicle. Electric machines are also provided with some motor vehicle transmissions in order to make the motor vehicle transmission suitable for use in a hybrid or electric vehicle. Whereas the rest of the components of the transmission are enclosed and shielded by the surrounding transmission housing, the shafts guided out of the transmission housing induce electromagnetic interference, which, in the area of a motor vehicle, results in a malfunction of other electronic components. In addition, a potential difference builds up between the shaft and the transmission housing, which results in perforations on bearings of the shaft and thus, reduces the service life of these bearings. For this reason, the shaft concerned should be grounded, if possible. A shaft is also to be grounded with respect to other electric machines provided in a motor vehicle, such as, for example, electric axle drive units, in order to eliminate or reduce electromagnetic interference and to prevent the build-up of a potential difference. Grounding is usually carried out by electrically conductively connecting the shaft to be grounded to a ground, which is usually a housing.

DE 10 2019 133 677 A1 describes an arrangement for grounding a rotor shaft of an electric machine, wherein the rotor shaft in this arrangement is electrically conductively connected via a tubular grounding hub to a housing, which acts as a ground for grounding the rotor shaft. The grounding hub is supported at one axial end on the rotor shaft via a support bearing and is floatingly mounted at an opposite axial end in a housing cover of the housing. For the floating mounting, an electrically conductive, radially spring-loaded intermediate element is radially between the grounding hub and the housing cover, the intermediate element, as a conductor element, also establishing the electrically conductive connection between the grounding hub and the housing. On the rotor shaft side, an electrically conductive connection between the grounding hub and the rotor shaft is established as a sliding contact via a contact element, which is a carbon pin. The carbon pin is mounted on the rotor shaft and guided in a carbon brush holder, which is mounted on the grounding hub. Due to sliding contact between the carbon pin and the carbon brush holder, the electrically conductive connection is established between the grounding hub and the rotor shaft.

SUMMARY OF THE INVENTION

The present invention provides a reliable arrangement for grounding a shaft, characterized by the lowest possible manufacturing complexity.

According to the invention, an arrangement for grounding a shaft includes a grounding hub, via which the shaft to be grounded is electrically conductively connected to a ground, preferably a housing.

A "shaft" as set forth in the invention should be understood, in principle, as a rotatable component which transmits a rotational motion between components to be coupled. This shaft is also integral with one or both component(s) to be coupled. It is particularly preferred when the shaft to be grounded is a rotor shaft which is provided for a corotational connection with a rotor of an electric machine. The rotor and the rotor shaft are also formable as one piece or as individual components which are separate and connected to one another for conjoint rotation. The electric machine is an integral part of a motor vehicle transmission. The shaft to be grounded is also, in principle, any type of shaft, such as, for example, a transmission shaft.

In the arrangement according to the invention, the grounding hub electrically conductively connects the shaft to be grounded to the ground by the grounding hub being electrically conductively connected to the shaft to be grounded and also electrically conductively connected to the ground. The grounding hub consists of an electrically conductive material, at least in contact regions with the ground and the shaft to be grounded and in an intermediate region connecting these contact regions. The grounding hub is preferably formed completely of an electrically conductive material, however.

The grounding hub as set forth in the invention has, in particular, a rod-like shape, i.e., it is an elongate component, similarly to a shaft, in order to establish the electrically conductive connection preferably axially between the shaft to be grounded and the ground within the arrangement according to the invention. It is further preferred when the grounding hub is rotationally symmetrical.

The ground, with which the electrically conductive connection of the shaft to be grounded is established via the intermediate grounding hub, is, as set forth in the invention, an electrically conductive body, to which, in particular, the potential zero is assigned as reference potential. Preferably, this ground is present as a housing. The electrically conductive connection of the grounding hub is specifically established at this housing, a housing part, or a component which is permanently electrically connected thereto. It is particularly preferred when the grounding hub establishes an electrically conductive connection of the shaft to be grounded with a housing cover of a housing.

Within the scope of the invention, "axial" means an orientation towards an axis of rotation of the shaft or of a longitudinal axis of the grounding hub, whereas "radial" means an orientation in the diameter direction from the axis of rotation of the shaft to be grounded or from the longitudinal axis of the grounding hub.

As set forth in the invention, an "electrically conductive" connection should be understood as a connection in which a current flow is made possible between the connected components. With respect to the arrangement according to the invention, this electrically conductive connection is formed between the ground and the grounding hub, and between the grounding hub and the shaft to be grounded, wherein this connection is implementable directly or indirectly via further, intermediate components.

In particular, a bearing is between the grounding hub and the shaft to be grounded, via which bearing the shaft to be grounded is mounted for rotation with respect to the grounding hub. This bearing is, in particular, a radial bearing, this radial bearing preferably being a roller bearing and, particularly preferably, a grooved ball bearing. Within the scope of the invention, the intermediate bearing could be a different bearing, such as, for example, a roller bearing, or even a plain bearing.

The invention now encompasses the technical teaching that a separate guide element is mounted on the grounding hub, the guide element rotationally fixing the grounding hub in a direction of rotation and/or limiting a displacement of the grounding hub in at least one axial direction. In other words, a guide element is a separate component, via which the grounding hub is secured against rotation or via which an axial displacement of the grounding hub is limited in at least one axial direction or via which the grounding hub is secured against rotation and an axial displacement of the grounding hub is limited in at least one axial direction. This guide element is mounted on the grounding hub, i.e., the guide element and the grounding hub are fixed to one another, preferably the guide element is directly mounted on the grounding hub.

Such an embodiment of an arrangement has the advantage that the grounding hub is reliably securable against rotation and/or an axial displacement of the grounding hub is reliably limitable. Due to the fact that the guide element is present as a separate component which is mounted on the grounding hub, a complex formation of a section for preventing rotation of the grounding hub and/or axially securing the grounding hub is dispensed with on the grounding hub side. Therefore, the arrangement is achieved with low manufacturing complexity and, in addition, a reliable grounding of a shaft is provided. According to one embodiment of the invention, the guide element secures the grounding hub against rotation on the ground side by at least one rib formed on the guide element or on the ground, each of the at least one rib projects radially and extends in the circumferential direction over a subsection, and projects into a respective recess, each recess being delimited on both sides of the at least one rib in the circumferential direction and formed on the ground or on the guide element. As a result, rotation prevention is achieved easily by positive engagement. It is particularly preferred when the at least one rib projects radially with respect to the rest of the guide element, while the associated recess is defined on the ground side, in particular by a corresponding configuration of the housing which forms the ground. In particular, the guide element is equipped with multiple ribs, particularly preferably with two ribs.

According to one example aspect of the invention, the guide element is ring-shaped and mounted via an inner diameter on an outer diameter of the grounding hub. In this case, the guide element is therefore mounted on the grounding hub such that the guide element radially surrounds the grounding hub, for the purpose of which the guide element has a ring-shaped configuration. In addition to the ring-shaped configuration, the guide element additionally preferably has a disk-shaped character such that the guide element is a ring-shaped guide disk.

In one development of this example aspect, the guide element is pressed or press-fit onto the grounding hub. Advantageously, a reliable mounting of the guide element on the grounding hub is achieved as a result. If the grounding hub has been produced using an extrusion process, the guide element may have also been integrated in the shaping process of the grounding hub. In addition, mounting via welding, soldering, or via unfolding is also conceivable.

Alternatively, it is conceivable that the guide element is ring-shaped due to an alternative configuration and is mounted via an outer diameter on an inner diameter of the grounding hub.

In another embodiment of the invention, the grounding hub is electrically conductively connected to the ground via an intermediate conductor element. In this case, the grounding hub is therefore not directly electrically conductively connected to the ground. Instead, the electrically conductive connection is established via an intermediate component as a conductor element.

In one development of the aforementioned embodiment, the conductor element is a spring element, via which the grounding hub is axially preloaded towards the shaft to be grounded, the spring element axially electrically contacting the grounding hub to the ground. In one development of the invention, the conductor element is placed axially between the ground and an end face of the grounding hub facing away from the shaft to be grounded. The conductor element is situated, in particular, axially between the end face of the grounding hub and an abutment shoulder formed by the ground. Advantageously, as a result, a radially compact configuration is achieved by placing the radially compact conductor element on an axial end of the grounding hub and thus on an end face of the grounding hub. Particularly preferably, an abutment surface is defined on the end face of the grounding hub, at which abutment surface an axial contact of the grounding hub with the conductor element is established. If the conductor element is a spring element, force is introduced axially at the abutment surface for preloading the grounding hub.

Alternatively, the conductor element is axially between the ground and the guide element, which is mounted on the outer diameter of the grounding hub. Therefore, the conductor element radially surrounds the grounding hub, wherein the conductor element, as a spring element, then uses the guide element to axially preload the grounding hub. This has the advantage that the diameter of the grounding hub is therefore kept small and, as a result, its production is simplified. In addition, if the grounding hub is tubular and provided for supplying lubricant, the conductor element is no longer subjected to the lubricant pressure due to the placement on the outer diameter of the grounding hub. Improved electrical contacting is to be expected as a result.

Particularly preferably, the spring element is a wave spring, as a result of which the axial electrical contact is established with a low contact length and thus also with low contact resistance. Alternatively, the spring element could also be, in principle, a helical spring, a disk spring or the like.

In another example aspect of the invention, the grounding hub is floatingly mounted on the ground side. The grounding hub is therefore axially movable with play with respect to the ground, as a result of which the axial preload of the grounding hub is easily implemented, in particular, via the spring element. This is the case because, as a result, the grounding hub is axially displaceable relative to the ground and thus also preloaded relative to the ground. In combination with the conductor element, which is a spring element, the axial electric contact between the grounding hub and the ground is then achievable via the spring element.

In one development of the aforementioned embodiment, the grounding hub forms a guide section on a subsection thereof, on which guide section the grounding hub is axially displaceably guided in a guide bore on the ground side. As a result, the floating mounting of the grounding hub on the ground is easily achieved. It is particularly preferred when the guide section is formed as an axially extending section.

It is further preferred when the guide bore is defined by a contour and lengthened axially into the region in which the conductor element is between an abutment shoulder of the ground and the guide element. The conductor element and the abutment shoulder of the ground radially surround the guide bore. This has the advantage that a sealing length in the guide area of the grounding hub on the ground is therefore lengthened. In addition, sizing the conductor element is therefore no longer dependent on an outer diameter of the grounding hub, in that the conductor element is radially further outward with respect to the grounding hub.

According to another embodiment of the invention, the guide element limits an axial displacement of the grounding hub with respect to the ground in at least one axial direction via interaction with one axial stop in each case. Advantageously, as a result, an axial movement of the grounding hub with respect to the ground in the corresponding direction is limited, wherein, when a spring element is used as the conductor element to limit the axial movement towards the spring element, excessive compression of the spring element is prevented. A limitation of the axial movement of the grounding hub in the opposite direction, specifically towards the shaft to be grounded, is advantageous for an installation of the arrangement according to the invention, however, in that the grounding hub is axially fixed within the scope of the installation prior to the establishment of axial contact with the shaft to be grounded.

In one development of the aforementioned embodiment, the one stop in each case is an abutment shoulder of the ground and/or by a snap ring. The snap ring is placed in a corresponding groove particularly preferably on the ground side and is therefore axially fixed on the ground. In both cases, a stop is realized in a simple way.

Alternatively, or in addition to the aforementioned development, an axial displacement of the grounding hub with respect to the ground towards the shaft to be grounded is limited due to the interaction of the guide element with the snap ring, whereas a limitation in an opposite axial displacement direction of the grounding hub is formed by interaction of the guide element with an abutment shoulder. In this case, therefore, axial displacements of the grounding hub are limited in both directions, wherein this is achieved in one axial direction due to the interaction of the guide element with a snap ring and in the other axial direction due to the interaction of the guide element with an abutment shoulder.

In one embodiment of the invention, the grounding hub is tubular at least in sections and, via an internal volume, connects a supply connection for lubricant and/or coolant on the ground side to the shaft to be grounded. As a result, in addition to establishing the electrically conductive connection between the shaft to be grounded and the ground, the grounding hub also performs the function of supplying lubricant and/or coolant to the shaft to be grounded, for the purpose of which the grounding hub is tubular at least in sections.

The lubricant and/or coolant is guided via an internal volume of the grounding hub, which is tubular at least in sections, and a resultant defined supply line to the shaft to be grounded. The medium is preferably oil, the medium is provided for cooling the shaft, which is, in particular, a rotor shaft. The grounding hub is tubular at least over a portion of its axial extension, an internal volume being delimited by the surrounding material of the grounding hub at least in the tubular portion and thus the supply line being defined in this region. Particularly preferably, however, the grounding hub is entirely a tube, in order to therefore enable the lubricant and/or coolant to be supplied via the entire axial extension of the grounding hub and thus also to achieve guidance of the medium from the one axial end of the grounding hub to the other axial end. This embodiment is combined, in particular, with the development of the invention, in which the grounding hub is permanently secured against rotation, since, as a result, a flow of the lubricant and/or coolant via the grounding hub is simplified because the grounding hub does not rotate.

In one development of the aforementioned embodiment, the internal volume of the grounding hub is connected to a radial outer region of the grounding hub via at least one bore. As a result, a portion of the lubricant and/or coolant conducted via the internal volume is also directable into the radial outer region of the grounding hub, in order to also supply other components in addition to the shaft to be grounded, such as, for example, bearings and/or gears, etc. It is particularly preferred when the at least one bore is axially adjacent to an inner ring of a bearing, which connects the grounding hub to the shaft to be grounded. Furthermore, the at least one bore lies vertically below, in particular in the installed position of the grounding hub, in order to allow a portion of the lubricant and/or coolant to easily flow out via the at least one bore.

In one development of the invention, the grounding hub has a diameter reduction, on which a bearing having an inner ring is placed, the bearing connecting the grounding hub to the shaft to be grounded. As a result, a projection and thus also an abutment shoulder are defined on the grounding hub side, via which abutment shoulder an axial force introduced into the grounding hub is transmittable onto the inner ring of the bearing. This diameter reduction, in combination with the aforementioned embodiment, in which the grounding hub supplies lubricant and/or coolant to the shaft to be grounded, is also usable to change the flow cross-section and thus to adjust the amount of lubricant and/or coolant conducted to the shaft. Alternatively, or additionally, a sleeve is provided in the grounding hub on the side of the shaft to be grounded in the region of a mouth of the interior space of the grounding hub, via which sleeve the flow cross-section is also changeable and thus the amount of lubricant and/or coolant is also adjustable.

According to one advantageous embodiment of the invention, a bearing electrically conductively connects the grounding hub to the shaft to be grounded. In this case, the electrically conductive connection is therefore established between the grounding hub and the shaft to be grounded via an intermediate bearing, as a result of which a separate connecting element is eliminated and thus the manufacturing complexity is reduced. This is the case because the bearing is placed on a small diameter between the grounding hub and the shaft to be grounded, as a result of which low peripheral speeds arise at the bearing. Due to these low peripheral speeds, an insulating effect of lubricant of the bearing, which otherwise increases as the speed increases, is avoided, which could otherwise make the electrically conductive connection via the bearing more difficult. Within the scope of the invention, the electrically conductive connection is established between the grounding hub and the shaft to be grounded equally well via a separate contact element, such as, for example, a carbon brush.

According to one example aspect of the invention, the grounding hub is made of aluminum. This has the advantage that, due to the grounding hub being made of aluminum, a high conductivity of the grounding hub for alternating current is achieved. In addition, the grounding hub therefore has a low weight, such that weight is reduced overall in the arrangement. Preferably, the grounding hub has been manufactured in an extrusion process. Alternatively, the grounding hub could also consist of copper or be a plastic body with an electrically conductive coating. It is particularly preferred when the guide element, which is separate and mounted on the grounding hub, also consists of aluminum.

Alternatively, it is also conceivable within the scope of the invention that the guide element is made of a material having higher strength in comparison to aluminum. As a result, a higher breaking elongation and thus also reliably securing the grounding hub against rotation and/or reliably delimiting an axial displacement of the grounding hub is achieved in the region of the guide element. The guide element is made of steel, although another material having a higher strength in comparison to aluminum is usable, such as, for example, a composite material, i.e., a combination of multiple materials.

The invention also relates to a transmission, which is, in particular, a motor vehicle transmission. In this transmission, at least one shaft is grounded in an arrangement according to one or more of the aforementioned variants. This arrangement is achieved, in particular, with a rotor shaft of an electric machine which is integrated into the housing. An arrangement according to the invention for grounding the shaft is also an integral part of an electric drive axle unit for a motor vehicle or of an electric machine.

BRIEF DESCRIPTION OF THE DRAWINGS

Advantageous embodiments of the invention, which are explained in the following, are shown in the drawings, in which.

DETAILED DESCRIPTION

Figure 1:
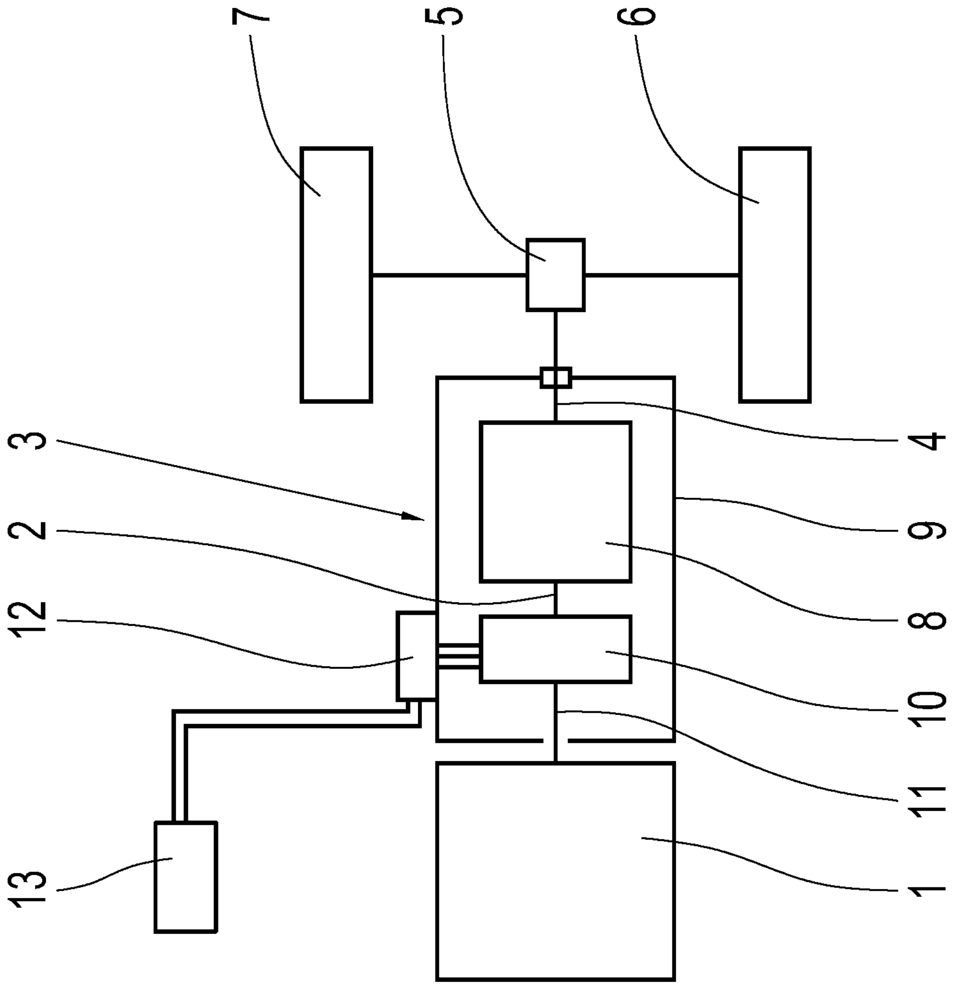
FIG. 1 shows a schematic view of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a drive train for a motor vehicle. This drive train includes an internal combustion engine 1, the output of which is coupled to an input shaft 2 of a transmission 3. An output shaft 4 of the transmission 3 is connected to a differential gear 5. The differential gear 5 distributes the power applied at the output shaft 4 to driving wheels 6, 7 of the motor vehicle. The transmission 3 has a gear set 8 which, together with shift elements (not shown in FIG. 1), provides various transmission ratios between the input shaft 2 and the output shaft 4. The gear set 8 is enclosed in a housing 9 which also accommodates an electric machine 10, the electric machine 10 being connected to the input shaft 2. The electric machine 10 drives the input shaft 2, particularly, a shaft 11 as a rotor shaft of the electric machine 10 connects the input shaft 2 to the output of the internal combustion engine 1.

In addition, a power inverter 12 is mounted on the housing 9. The power inverter 12 is connected to the electric machine 10 on one side and to a battery 13 on the other side. The power inverter 12 is utilized for converting the direct current of the battery 13 into an alternating current, which is suitable for operating the electric machine 10, and includes several power semiconductors for this purpose. The conversion between direct current and alternating current takes place by a pulse-like operation of the power semiconductors controlled by an open-loop system.

Figure 2:
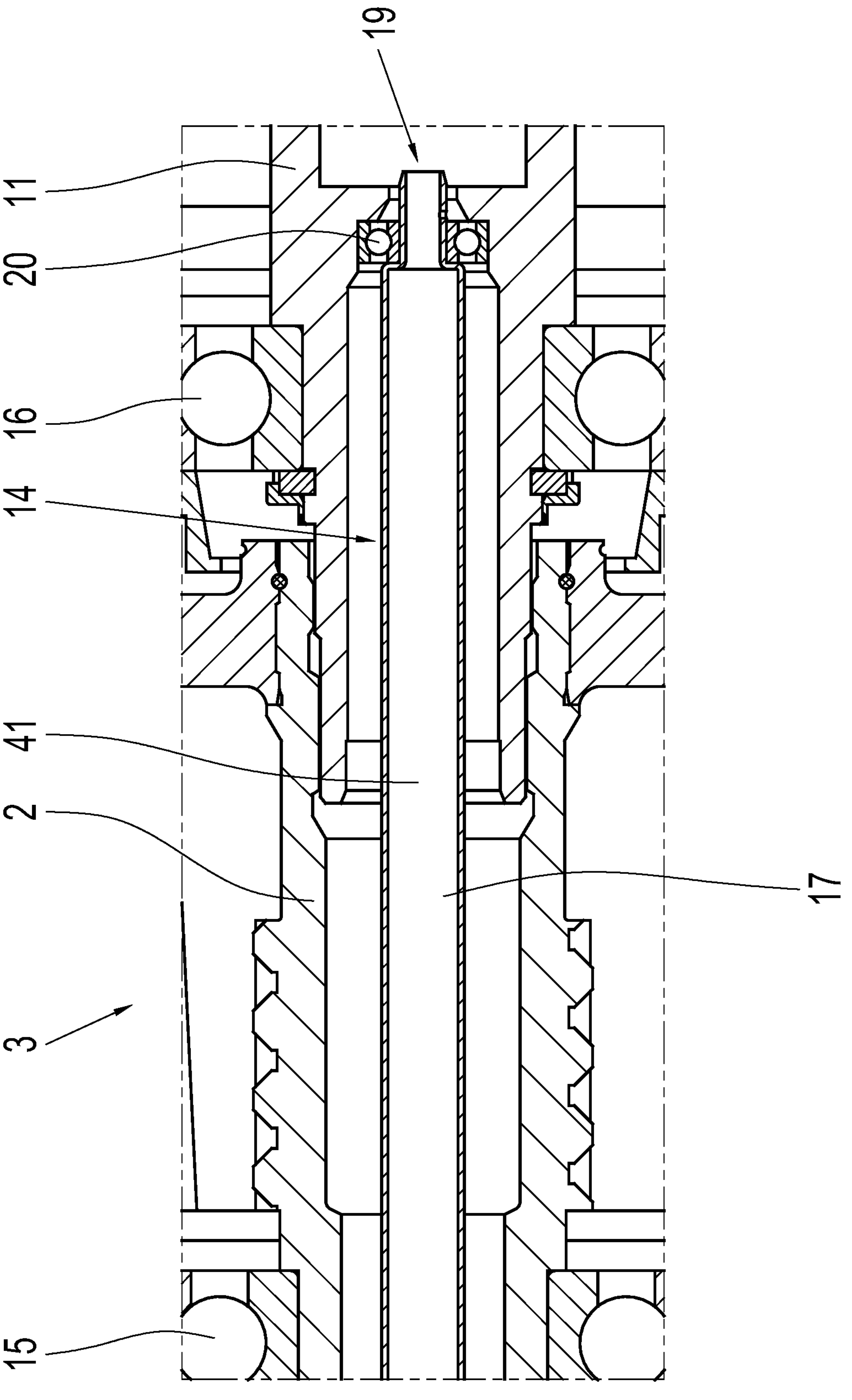
FIG. 2 shows a sectional view of a transmission of the drive train from FIG. 1 in the region of part of a grounding arrangement according to the invention, according to a first embodiment of the invention.
Figure 3:
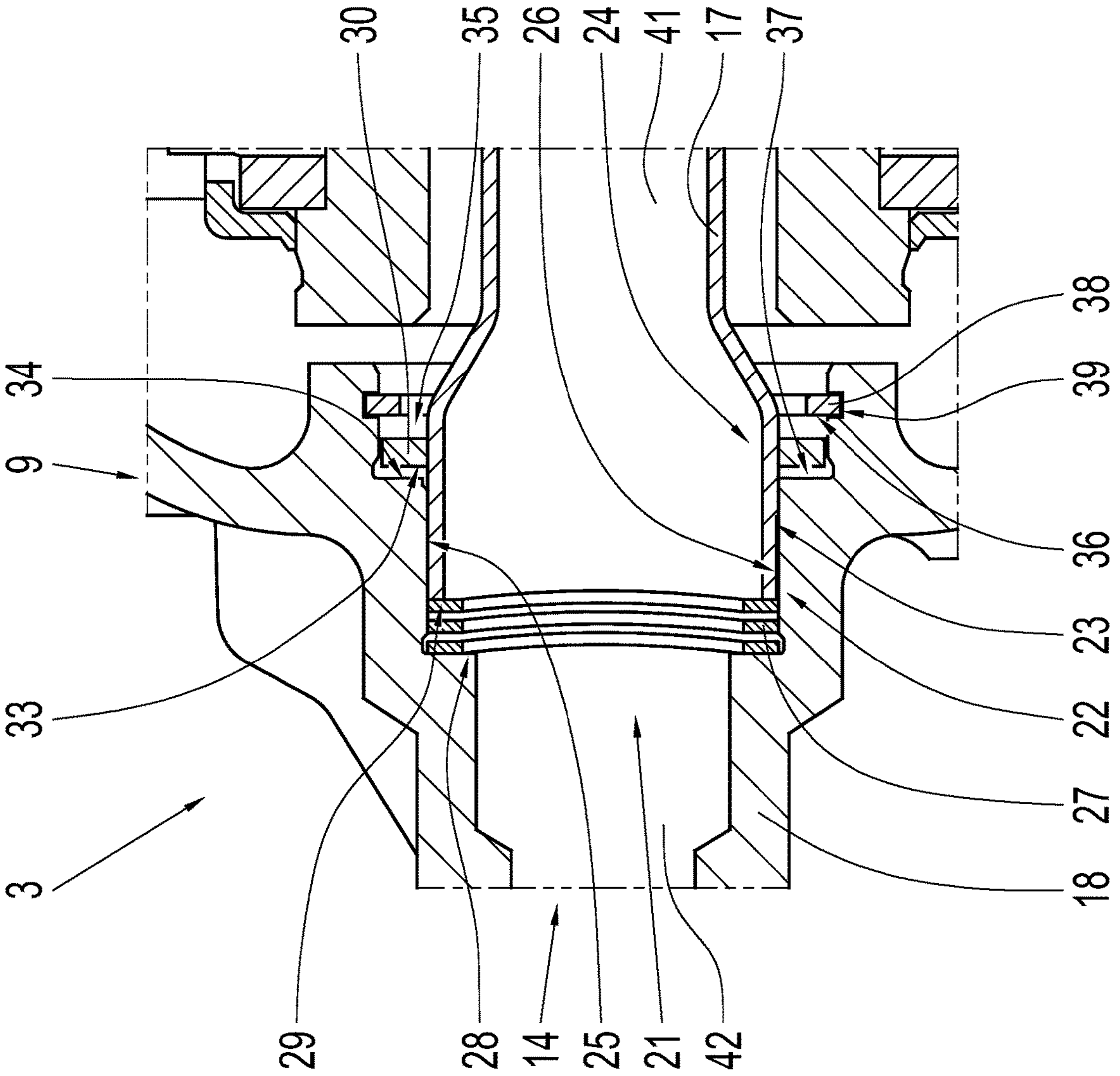
FIG. 3 shows another sectional view of another part of the grounding arrangement from FIG. 2.

The shaft 11 of the electric machine 10 is grounded in order to prevent electromagnetic interference and the build-up of a potential difference during operation. This is shown in FIGS. 2-3, each of which shows one part of an arrangement 14 for grounding the shaft 11. As is apparent in FIG. 2, the shaft 11 is connected inside the transmission 3 to the input shaft 2 for conjoint rotation, the shaft 11 and the input shaft 2 being jointly rotatably mounted via roller bearings 15 and 16. The arrangement 14 for grounding the shaft 11, according to a first embodiment of the invention, includes a grounding hub 17, which is electrically conductively connected on one side to the shaft 11 (FIG. 2) and, on the other side, is electrically conductively connected to a housing cover 18 (FIG. 3) of the housing 9.

Figure 4:
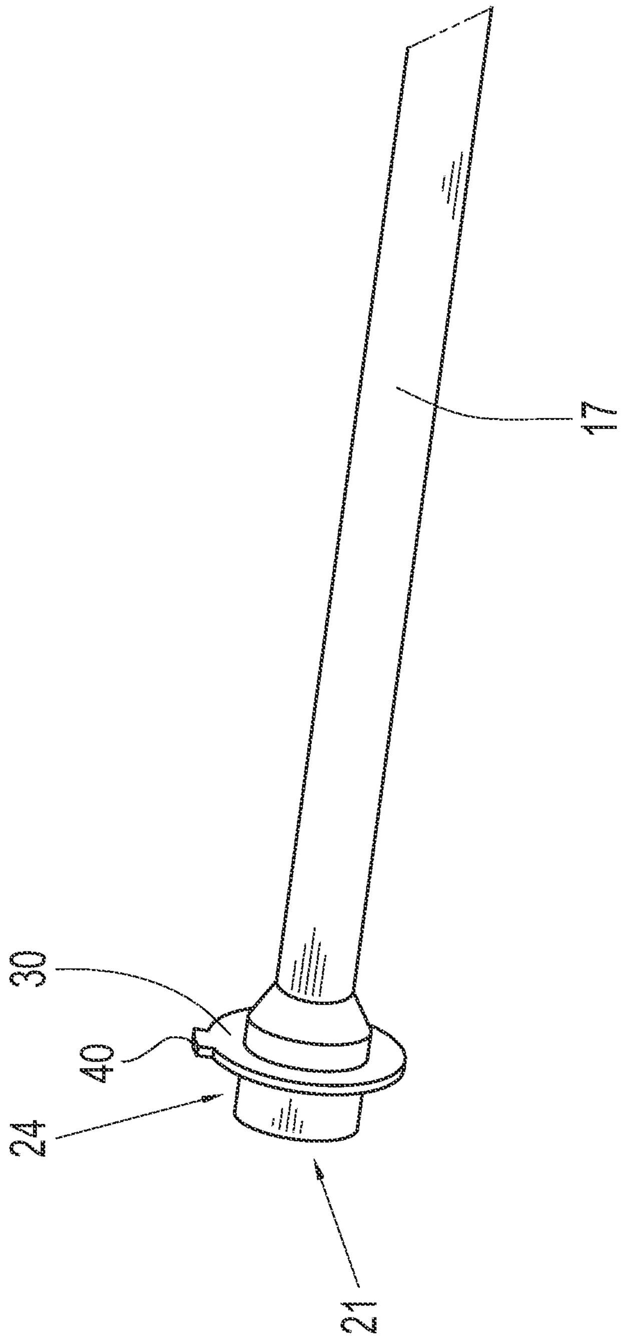
FIG. 4 shows a perspective, detail view of a part of the grounding arrangement from FIG. 2.

As is apparent with reference to FIGS. 2-4, each of which shows a perspective view of one part of the grounding hub 17, the grounding hub 17 is predominantly a tubular body. The grounding hub 17 extends axially from the housing cover 18 (FIG. 3) through the input shaft 2 (FIG. 2), which is a hollow shaft, into the shaft 11 (FIG. 2), the shaft 11 also being a hollow shaft for this purpose. The grounding hub 17 is made of an electrically conductive material, such as aluminum. A bearing 20 (FIG. 2) is positioned on the grounding hub 17 in the region of or "proximate" one axial end 19 (FIG. 2) of the grounding hub 17. Via this bearing 20, the shaft 11 is mounted for rotation with respect to the permanently stationary grounding hub 17. Apart therefrom, the bearing 20, which is a roller bearing, also electrically connects the shaft 11 with the grounding hub 17 such that the electrically conductive connection between the shaft 11 to be grounded and the grounding hub 17 is therefore established via the intermediate bearing 20.

On an axial end 21 (FIG. 3) situated opposite the axial end 19 (FIG. 2), the grounding hub 17 is additionally floatingly mounted in the housing cover 18, this region being shown in FIG. 3. As is apparent here, the floating mounting is implemented on a guide section 22 of the grounding hub 17, this guide section 22 being defined by an outer diameter 23 of a section 24 which is at the axial end 21 of the grounding hub 17. The grounding hub 17 including the guide section 22 is axially displaceably guided on an inner diameter 25 of a guide bore 26 of the housing cover 18.

As is also apparent from FIG. 3, a spring element 27 is additionally on the end face of the grounding hub 17 at the axial end 21, the spring element 27 being axially between the axial end 21 of the grounding hub 17 and a projection 28 of the housing cover 17. The spring element 27 is a wave spring in the present case, the wave spring being supported against the projection 28 on the housing cover 18 side and against an end face 29 of the grounding hub 17 on the grounding hub 17 side. Via the spring element 27, the grounding hub 17 is axially preloaded against the bearing 20 (FIG. 2), thereby ensuring an appropriate axial preload of the bearing 20 for achieving low-noise operation and additionally ensuring that the contact between the grounding hub 17 and the bearing 20, and thus also the shaft 11 to be grounded, is maintained.

The spring element 27 is also used, however, to establish axial contact between the grounding hub 17 and the housing cover 18 of the housing 9, in order to always maintain the electrically conductive connection between the grounding hub 17 and the housing cover 18 in this case as well. Due to the spring element 27 being a wave spring, this electrical contact is established with a short conduction path and thus, with low contact resistance.

As is apparent in FIG. 3 and, in particular, also in FIG. 4, a guide element 30 is on the grounding hub 17, the guide element 30 being mounted on the outer diameter 23 of the section 24 of the grounding hub 17. The guide element 30 is shown individually in a perspective view in FIG. 5, the guide element 30 being a ring-shaped body 31, at the inner diameter 32 of which the guide element 30 is mountable on the outer diameter 23 of the section 24 of the grounding hub 17 (FIG. 3). The guide element 30 is made of a material having a higher strength in comparison to aluminum, the guide element 30 preferably consisting of steel. In particular, the guide element 30 is pressed onto the section 24 of the grounding hub 17 (FIG. 3) in order to reliably prevent the guide element 30 from rotating with respect to the grounding hub 17 and also to reliably prevent the guide element 30 from moving axially with respect to the grounding hub 17.

The guide element 30 is used to limit an axial relative displacement of the grounding hub 17 with respect to the housing cover 18 in both axial directions. For instance, as shown in FIG. 3, an axial displacement of the grounding hub 17 towards the spring element 27 being limited due to the interaction of a first axial end face 33 of the guide element 30 with a first axial stop 34 in order to prevent excessive compression of the spring element 27. In contrast, an opposite axial displacement of the grounding hub 17 with respect to the housing cover 18, specifically towards the bearing 20 (FIG. 2), is limited due to the interaction of a second axial end face 35 of the guide element 30 with an axial stop 36. This is advantageous in particular for an installation of the arrangement 14, in order to be able to pre-install the grounding hub 17 and the spring element 27 in the housing cover 18 prior to placing the bearing 20 between the grounding hub 17 and the shaft 11. The axial stop 34 is an abutment shoulder 37 defined on the housing cover 18 side, whereas the axial stop 36 is a snap ring 38 in a groove 39 in the housing cover 18.

Figure 5:
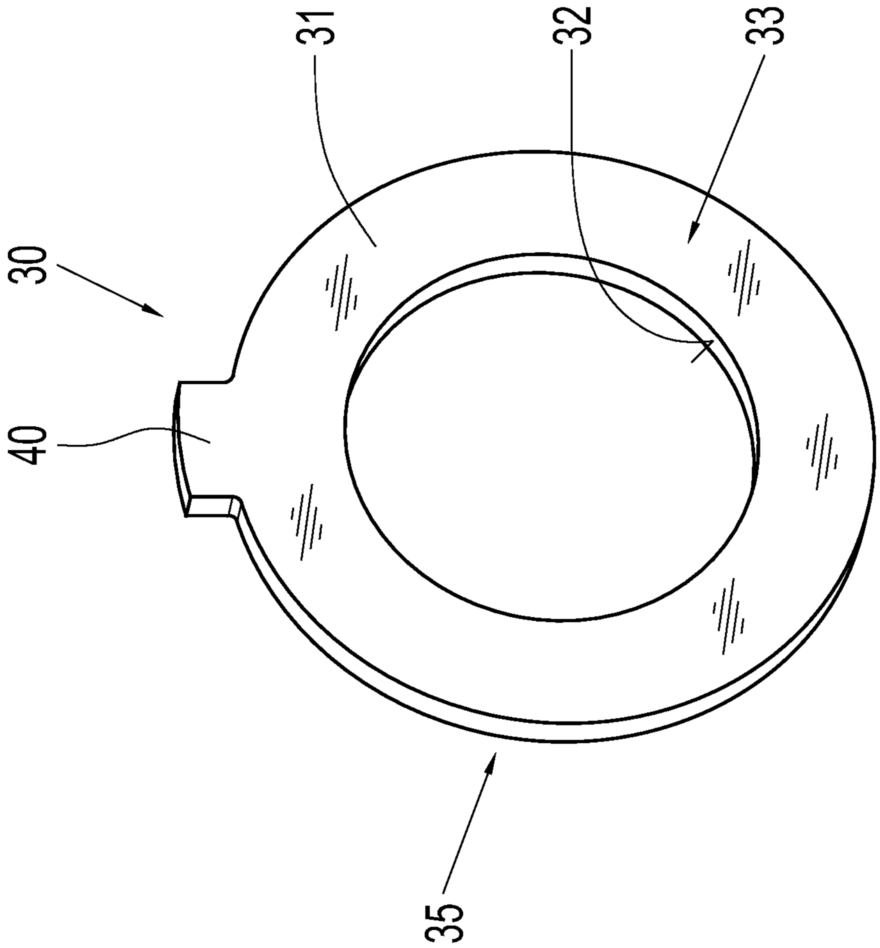
FIG. 5 shows a perspective, detail view of another part of the grounding arrangement from FIG. 2.

The guide element 30 also prevents rotation of the grounding hub 17 by the guide element 30 having a rib 40 which is apparent, in particular, in each of FIGS. 4 and 5. This rib 40 projects radially with respect to the ring-shaped body 31 and extends in the circumferential direction over a subsection of the body 31 and engages into a corresponding recess (not shown in the figures) formed on the housing cover 18 side in the region between the abutment shoulder 37 and the groove 39, the corresponding recess being delimited on both sides of the engaging rib 40 in the circumferential direction. Due to the interaction between the rib 40 and such corresponding recess, an inadvertent rotation of the grounding hub 17 with respect to the housing cover 17 is interlockingly prevented.

Apart from establishing the electrically conductive connection between the shaft 11 to be grounded and the housing cover 18, the grounding hub 17 is also used to supply lubricant and/or coolant to the shaft 11 to be grounded in order to cool the shaft 11 and, in particular, the rotor of the electric machine. The lubricant and/or coolant is preferably oil. The lubricant and/or coolant is introduced from the axial end 21 (FIGS. 3 and 4) into an internal volume 41 (FIGS. 2 and 3) of the grounding hub 17 by a supply connection 42 (FIG. 3) for the lubricant and/or coolant formed in the housing cover 18 at the end face of the grounding hub 17 at the axial end 21.

Figure 6:
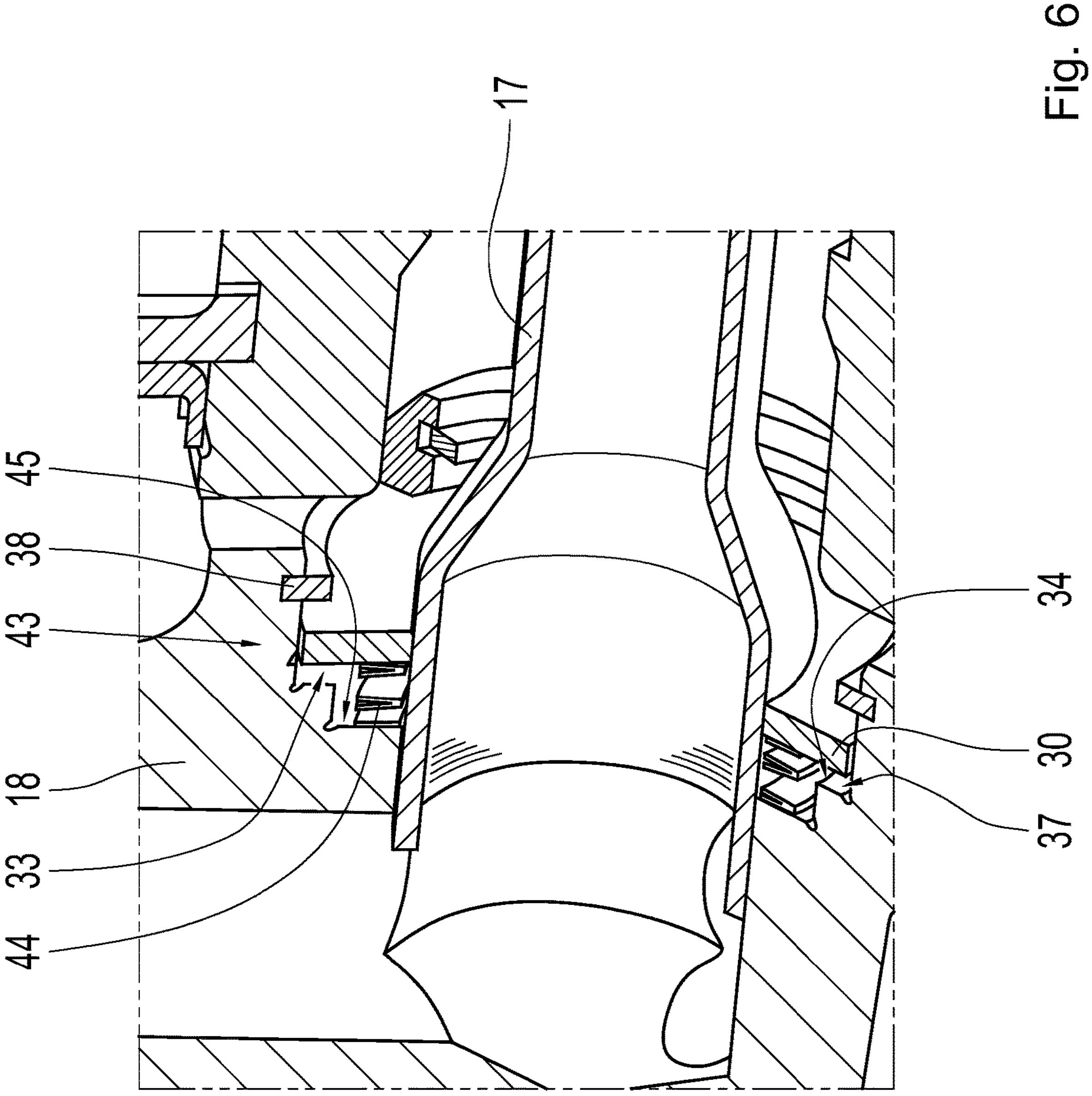
FIG. 6 shows a sectional view of a part of a grounding arrangement according to a second example aspect of the invention.

Furthermore, FIG. 6 shows a sectional view of a region of the transmission 3, in which a shaft (not shown here) is grounded via an arrangement 43 according to a second example aspect of the invention, where the shaft is electrically conductively connected to the housing cover 18 of the housing 9 via the grounding hub 17. This arrangement 43 substantially corresponds to the variant according to FIGS. 2-5, except that a spring element 44, via which an axial preload of the grounding hub 17 against a bearing (e.g., bearing 20) and an axial contact of the grounding hub 17 with the housing cover 18 is implemented, is now placed radially surrounding an outer diameter 23 of a section 24 of the grounding hub 17. The spring element 44, which is a wave spring, is axially between the guide element 30 mounted on the section 24, and an abutment shoulder 45, is the spring element 44 being supported axially on one side against the end face 33 of the guide element 30 and on the other side against the abutment shoulder 45.

The abutment shoulder 45 is defined on the housing cover 18 radially inward with respect to the abutment shoulder 37, which functions as the stop 34 for the guide element 30 with respect to the variant according to FIGS. 2-4. Otherwise, the rest of the example aspect according to FIG. 6 also corresponds to the variant according to FIGS. 2-5, and therefore reference is made to the description thereof.

Figure 7:
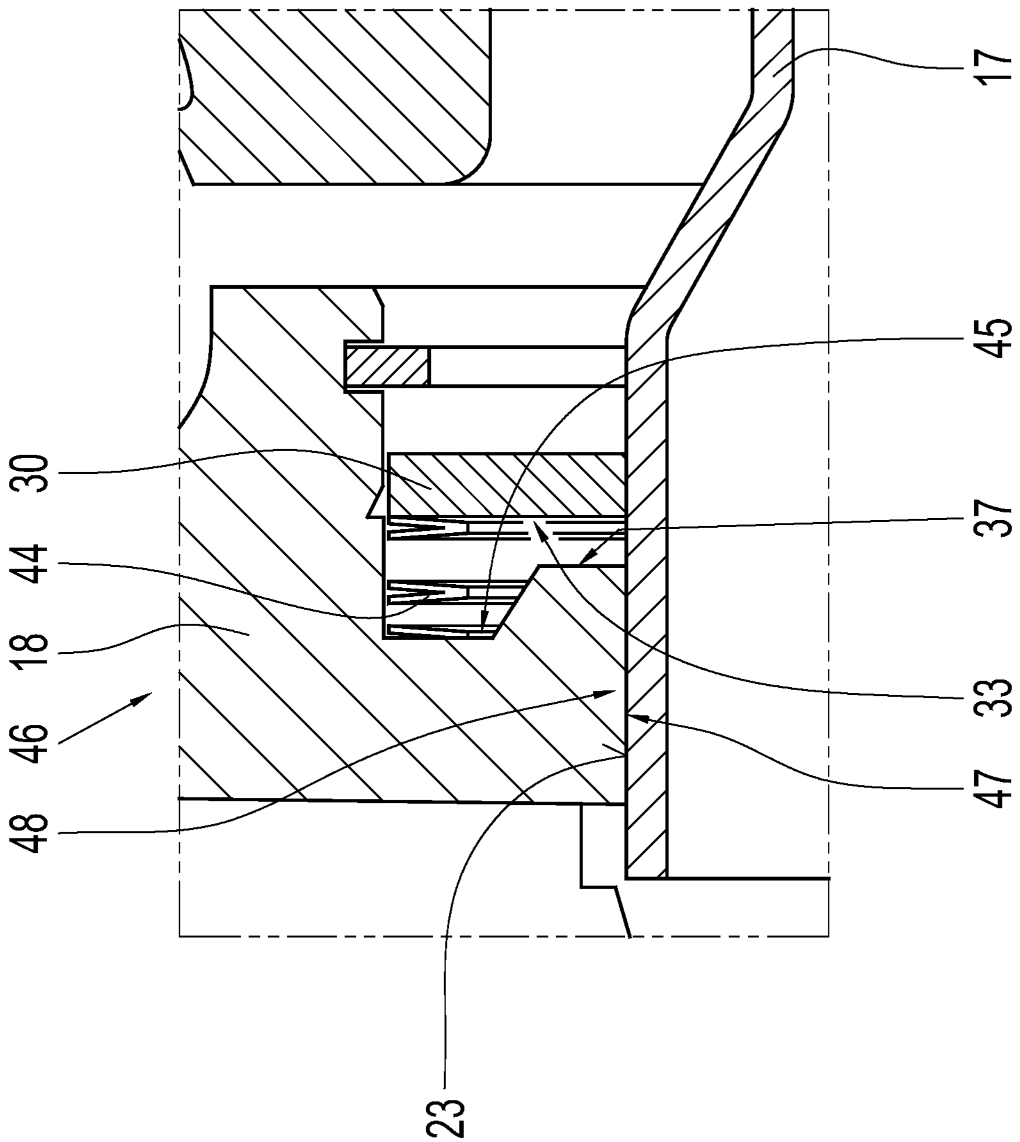
FIG. 7 shows a sectional view of a part of a grounding arrangement according to a third embodiment of the invention.

In addition, FIG. 7 shows a sectional view of a region of an arrangement 46 for grounding a shaft via the grounding hub 17 on the housing cover 18, this arrangement 46 being in accordance with a third example aspect of the invention and substantially corresponding to the preceding example aspect according to FIG. 6, except that the spring element 44 extends radially further outwards, with the abutment shoulder 45 for the spring element 44 being formed in FIG. 6 radially external to the abutment shoulder 37, which is used as a stop for the end face 33 of the guide element 30. The guide element 30 is again mounted on the grounding hub 17.

The abutment shoulder 37 and the abutment shoulder 45 are defined by a contour 47, which is a guide bore 48 for axially guiding the grounding hub 17 on the housing cover 18. The abutment shoulder 37 projects with respect to the abutment shoulder 45 axially towards the guide element 30, as a result of which the guide bore 48 is lengthened axially into the region in which the spring element 44 extends between the abutment shoulder 45 and the end face 33 of the guide element 30. As a result, a sealing length between an outer diameter 23 of the grounding hub 17 and the guide bore 48 is correspondingly axially lengthened. In addition, the spring element 44 extends radially further outwards, as a result of which a smaller number of windings is necessary in order to provide the force necessary to preload the grounding hub 17. The contour 47 is additionally used as a spacer element during installation of the spring element 44, in order to avoid a complete compression of the spring element 44 and thus destruction of the spring element 44. The rest of the embodiment according to FIG. 7 corresponds to the variant according to FIG. 6, and so reference is made to the description thereof.

Figure 8:
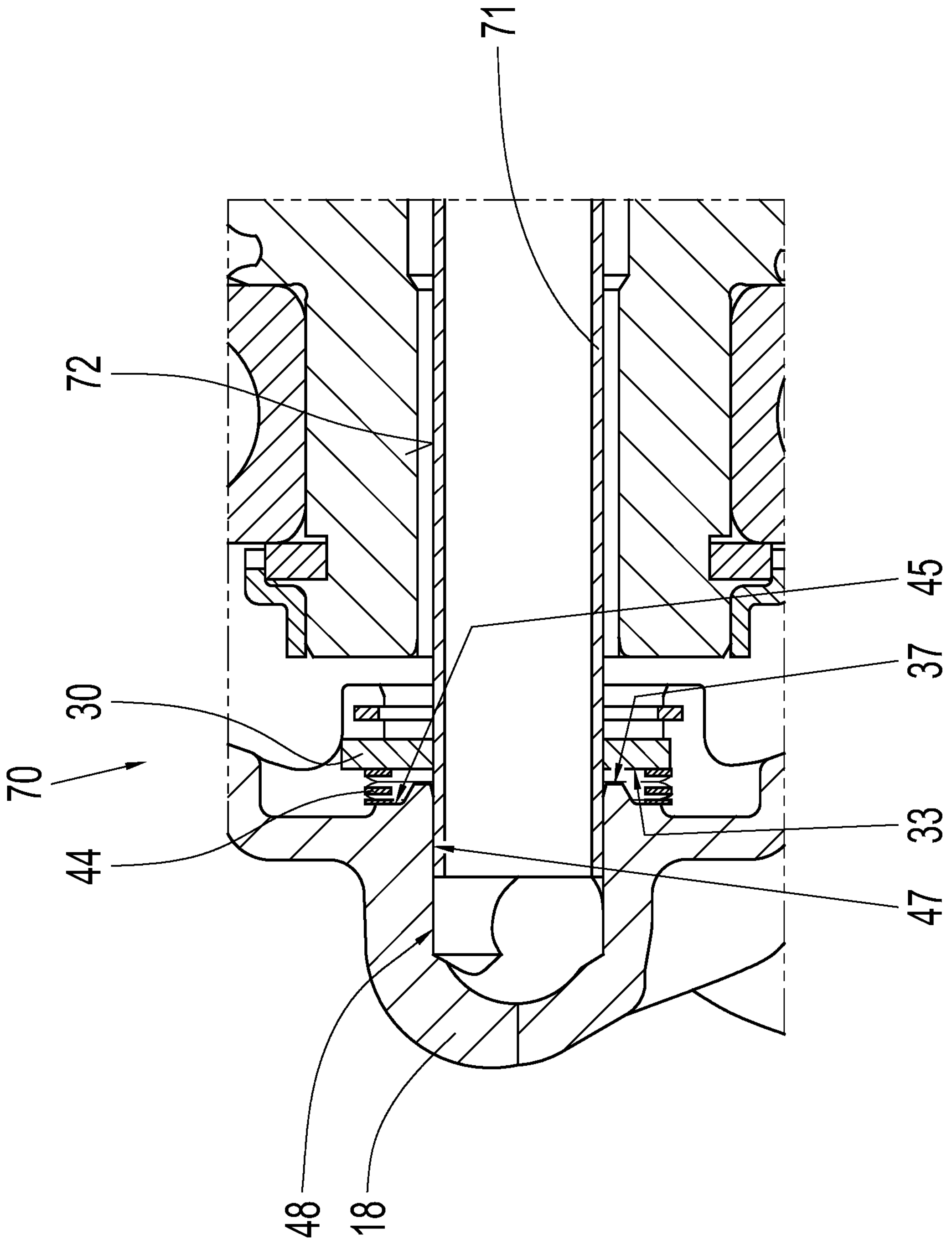
FIG. 8 shows a sectional view of a part of a grounding arrangement according to a fourth example aspect of the invention.

Furthermore, FIG. 8 shows a sectional view of a region of an arrangement 70 for grounding a shaft via a grounding hub 71 on the housing cover 18. This arrangement 70 is in accordance with a fourth example aspect of the invention and largely corresponds to the example aspect according to FIG. 7, except that the grounding hub 71, in the region of the housing cover 18, has a substantially continuous outer diameter 72, on which the guide element 30 is also mounted. The rest of the embodiment according to FIG. 8 corresponds to the variant according to FIG. 7, and so reference is made to the description thereof.

Figure 9:
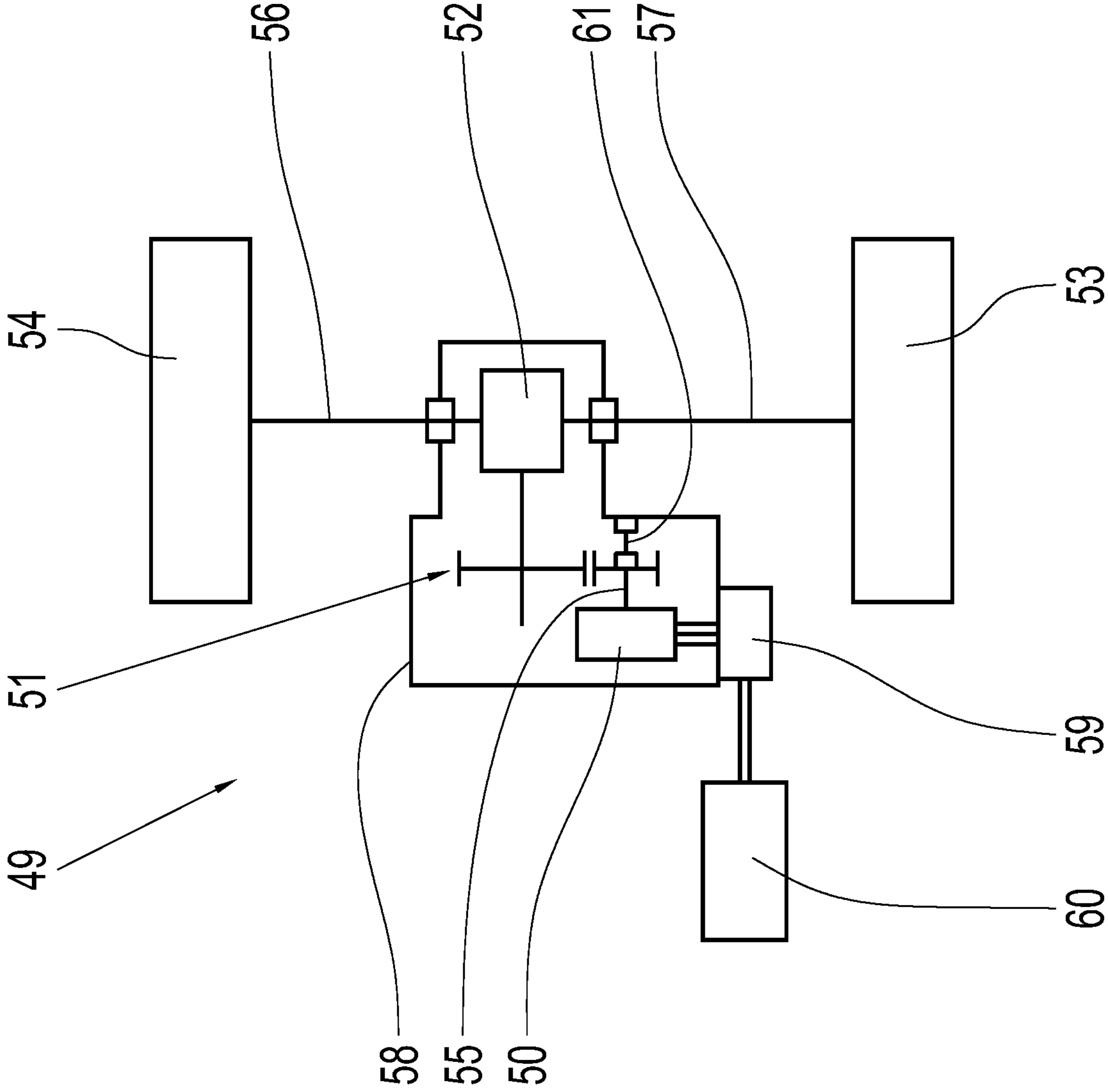
FIG. 9 shows a schematic view of a drive train of a motor vehicle.

FIG. 9 shows a schematic view of a drive train for a motor vehicle, which, in contrast to FIG. 1, is a purely electric drive train. The drive train includes an electric axle drive unit 49. The electric drive axle unit 49 includes an electric machine 50, the power of which is transmitted onto driving wheels 53 and 54 of a motor vehicle via a reduction gear set 51 and a differential gear 52. For this purpose, the electric machine 50 is connected at its output end at a shaft 55 to the reduction gear set 51. Output shafts 56, 57 of the differential gear 52 are connected to respective driving wheels 53, 54. The electric machine 50, the reduction gear set 51, and the differential gear 52 are enclosed in a housing 58. A power inverter 59 is mounted on the housing 58. The power inverter 59 is connected to the electric machine 50 on one side and to a battery 60 on the other side. The power inverter 59 is utilized for converting the direct current of the battery 60 into an alternating current, which is suitable for operating the electric machine 50, and includes several power semiconductors for this purpose. The conversion between direct current and alternating current takes place by a pulse-like operation of the power semiconductors controlled by an open-loop system.

In the present case, a grounding of the shaft 55 is carried out within the framework of an arrangement according to the invention, the arrangement being produced similarly to one of the variants according to FIGS. 2-8. A grounding hub 61 is also provided here, which is preloaded against the shaft 55 via a spring element, the spring element also establishing electrical contact. Reference is made to FIGS. 2-8 in this regard for a more precise configuration of the arrangement for grounding the shaft 55.

Figure 10:
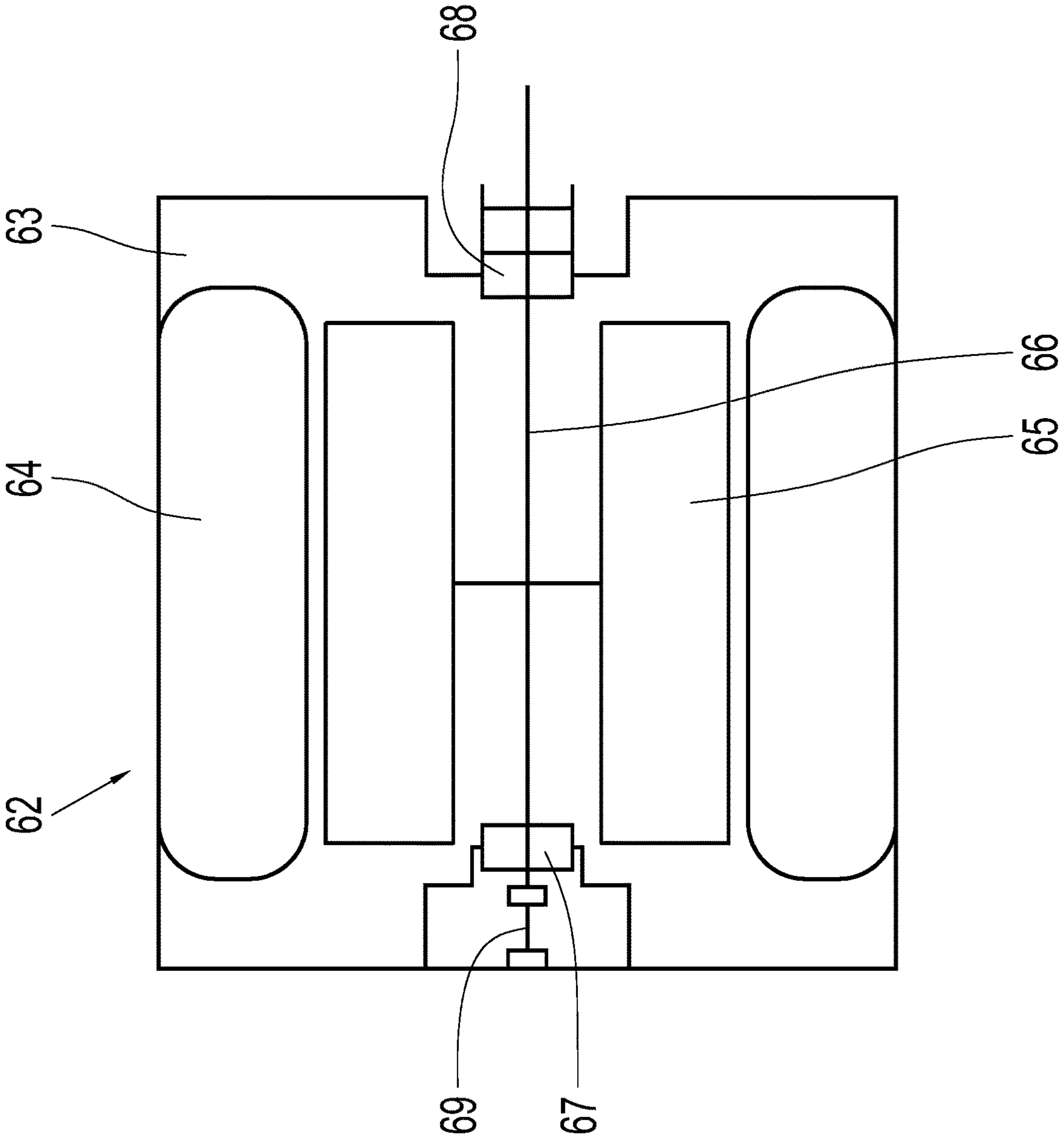
FIG. 10 shows a schematic view of an electric machine.

Finally, FIG. 10 shows a schematic view of an electric machine 62. The electric machine 62 has a housing 63, which accommodates a stator 64 and a rotor 65. The stator 64 is non-rotatably fixed in the housing 63. The rotor 65 is coupled to a rotor shaft 66. The rotor shaft 66 is rotatably mounted via two roller bearings 67, 68, which are supported against the housing 63. One end of the rotor shaft 66 projects out of the housing 63.

In the present case, the rotor shaft 66 is grounded within the framework of an arrangement according to the invention, the arrangement being produced similarly to one of the variants according to FIGS. 2-8. A grounding hub 69 is also provided here, which is preloaded against the rotor shaft 66 via a spring element, the spring element also establishing electrical contact. Reference is made to FIGS. 2-8 in this regard for a more precise configuration of the arrangement for grounding the rotor shaft 66.

Reliable grounding of a shaft is achieved by the embodiments of an arrangement according to the invention.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 internal combustion engine
2 input shaft
3 transmission
4 output shaft
5 differential gear
6 driving wheel
7 driving wheel
8 gear set
9 housing
10 electric machine
11 shaft
12 power inverter
13 battery
14 arrangement
15 roller bearing
16 roller bearing
17 grounding hub
18 housing cover
19 axial end
20 bearing
21 axial end
22 guide section
23 outer diameter
24 section
25 inner diameter
26 guide bore
27 spring element
28 projection
29 end face
30 guide element
31 body
32 inner diameter
33 end face
34 stop
35 end face
36 stop
37 abutment shoulder
38 snap ring
39 groove

40 rib
41 internal volume
42 supply connection
43 arrangement
44 spring element
45 abutment shoulder
46 arrangement
47 contour
48 guide bore
49 axle drive unit
50 electric machine
51 reduction gear set
52 differential gear
53 driving wheel
54 driving wheel
55 shaft
56 output shaft
57 output shaft
58 housing
59 power inverter
60 battery
61 grounding hub
62 electric machine
63 housing
64 stator
65 rotor
66 rotor shaft
67 roller bearing
68 roller bearing
69 grounding hub
70 arrangement
71 grounding hub
72 outer diameter

The invention claimed is:

1. An arrangement (14; 43; 46) for grounding a shaft (11) of an electric machine (10; 50; 62), the arrangement comprising:

a housing (9);

a grounding hub (17) for electrically conductively connecting a shaft (11) to be grounded to the housing (9), the housing (9) acting as a ground; and a guide element (30) mounted on the grounding hub (17), the guide element (30) at least one of rotationally fixing the grounding hub (17) in a direction of rotation or limiting displacement of the grounding hub (17) in at least one axial direction, wherein the grounding hub (17) is floatingly mounted on the housing (9).

2. The arrangement (14; 43; 46) of claim 1, wherein one of the housing or the guide element defines at least one rib (40) projecting radially and extending in a circumferential direction over a subsection thereof, the grounding hub (17) being secured against rotation relative to the housing by each of the at least one rib (40) projecting into a respective recess defined in another of the housing or the guide element.

3. The arrangement (14; 43; 46) of claim 1, wherein the guide element (30) is ring-shaped, an inner diameter (32) of the guide element (30) being mounted on an outer diameter (23) of the grounding hub (17) or an outer diameter of the guide element (30) being mounted on an inner diameter of the grounding hub (17).

4. The arrangement (14; 43; 46) of claim 1, wherein the guide element (30) is pressed onto the grounding hub (17).

5. The arrangement (14; 43; 46) of claim 1, further comprising an intermediate conductor element, the grounding hub (17) being electrically conductively connected to the housing via the intermediate conductor element.

6. The arrangement (14; 43; 46) of claim 5, wherein the intermediate conductor element is a spring element (27; 44), the grounding hub (17) being axially preloaded towards a shaft (11) to be grounded via the spring element.

7. The arrangement (14; 43; 46) of claim 6, wherein the spring element (27; 44) is a wave spring.

8. The arrangement (14) of claim 5, wherein the intermediate conductor element is placed axially between the housing and an end face (29) of the grounding hub (17) facing away from a shaft (11) to be grounded.

9. The arrangement (43; 46) of claim 5, wherein the intermediate conductor element is axially between the housing and the guide element (30).

10. The arrangement (14; 43; 46) of claim 1, wherein the grounding hub (17) defines a guide section (22), the guide section (22) of the grounding hub (17) being axially displaceably guided on a guide bore (26; 48) defined in the housing.

11. The arrangement (46) of claim 10, further comprising an intermediate conductor element, the grounding hub (17) being electrically conductively connected to the housing via the intermediate conductor element, the intermediate conductor element being between an abutment shoulder (45) of the housing and the guide element (30), wherein the guide bore (48) extends axially into the intermediate conductor element, and wherein the intermediate conductor element and the abutment shoulder (45) of the housing radially surround the guide bore (48).

12. The arrangement (14; 43; 46) of claim 1, wherein the guide element (30) interacts with an axial stop (34, 36) to limit displacement of the grounding hub (17) in the at least one axial direction with respect to the housing.

13. The arrangement (14; 43; 46) of claim 12, wherein the axial stop (34, 36) is defined by at least one of an abutment shoulder (37) of the housing or a snap ring (38).

14. The arrangement (14; 43; 46) of claim 1, wherein at least part of the grounding hub (17) is tubular, the part of the grounding hub (17) that is tubular connecting to a supply connection (42) on the housing for supplying at least one of lubricant or coolant to a shaft (11) to be grounded.

15. The arrangement (14; 43; 46) of claim 1, wherein the grounding hub (17) consists of aluminum.

16. A motor vehicle transmission (3), comprising at least one shaft (11) grounded by the arrangement of claim 1.

17. An electric drive axle unit (49) for a motor vehicle, comprising a shaft (55) grounded by the arrangement of claim 1.

18. An electric machine (62), comprising:

a stator (64), the stator (64) being rotationally fixed;

a rotor (65) rotatable relative to the stator (64); and a rotor shaft (66) coupled to the rotor (65), the rotor shaft (66) being grounded by the arrangement of claim 1.

* * * * *